United States Patent
Mori et al.

(10) Patent No.: US 8,836,642 B2
(45) Date of Patent: Sep. 16, 2014

(54) INFORMATION PROCESSING DEVICE, PROGRAM, AND INFORMATION PROCESSING METHOD

(75) Inventors: Maki Mori, Tokyo (JP); Yusuke Kudo, Kanagawa (JP); Takashi Kitao, Tokyo (JP); Ryo Fukazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 232 days.

(21) Appl. No.: 13/208,140

(22) Filed: Aug. 11, 2011

(65) Prior Publication Data

US 2012/0056877 A1 Mar. 8, 2012

(30) Foreign Application Priority Data

Sep. 7, 2010 (JP) ................ P2010-199743

(51) Int. Cl.
*G06F 3/033* (2013.01)
*G06F 3/0481* (2013.01)

(52) U.S. Cl.
CPC ................... *G06F 3/04815* (2013.01)
USPC ............ 345/157; 345/163; 715/850; 715/856

(58) Field of Classification Search
USPC ......... 345/156, 157, 158, 160, 163, 173, 664, 345/653; 715/757, 848, 850, 856–864
See application file for complete search history.

(56) References Cited

U.S. PATENT DOCUMENTS

| | | | | |
|---|---|---|---|---|
| 5,798,761 A | * | 8/1998 | Isaacs ............................ | 345/419 |
| 5,880,733 A | * | 3/1999 | Horvitz et al. ................ | 715/850 |
| 6,084,589 A | | 7/2000 | Shima | |
| 7,193,629 B2 | * | 3/2007 | Kake et al. ..................... | 345/581 |
| 7,278,115 B1 | * | 10/2007 | Conway et al. ............... | 715/838 |
| 7,893,920 B2 | * | 2/2011 | Endoh .......................... | 345/156 |
| 2001/0049300 A1 | * | 12/2001 | Okamoto et al. ............... | 463/30 |
| 2002/0060427 A1 | * | 5/2002 | Hinami ......................... | 273/237 |
| 2004/0021663 A1 | | 2/2004 | Suzuki et al. | |
| 2008/0225007 A1 | * | 9/2008 | Nakadaira et al. ............ | 345/173 |

FOREIGN PATENT DOCUMENTS

| | | |
|---|---|---|
| EP | 1 513 050 | 3/2005 |
| EP | 1 821 182 | 7/2007 |
| JP | 2004-70920 | 3/2004 |
| WO | WO 2008/093167 A2 | 8/2008 |

OTHER PUBLICATIONS

European Search Report of Corresponding European Application No. EP 11 17 7944 mailed Dec. 12, 2011.

* cited by examiner

*Primary Examiner* — Koosha Sharifi-Tafreshi
(74) *Attorney, Agent, or Firm* — Sherr & Jiang, PLLC

(57) ABSTRACT

There is provided an information processing device including a display control section which causes a three-dimensional space in which an object is arranged to be displayed on a display screen, an acquisition section which acquires a pointing operation in the three-dimensional space, and a position setting section which sets a pointing position in the three-dimensional space on the basis of the pointing operation. The display control section displays the pointing position in the three-dimensional space, a difference of the pointing position from a position of the object in a depth direction of the display screen having been corrected.

15 Claims, 16 Drawing Sheets

INFORMATION PROCESSING DEVICE, PROGRAM, AND INFORMATION PROCESSING METHOD

BACKGROUND

The present disclosure relates to an information processing device, a program, and an information processing method.

In recent years, GUIs (Graphical User Interfaces) provided to users via display screens have been more commonly displayed as virtual three-dimensional spaces. The position of an object arranged in a three-dimensional space is defined by the three-dimensional coordinates obtained by adding the depth direction to the two-dimensional coordinates, for example. As a technology used for such a GUI of a three-dimensional space, JP 2004-70920A discloses a technology of specifying the position of a cursor object, which is adapted to select an object, with the three-dimensional coordinates using a touch panel and a pressure-sensitive element.

SUMMARY

However, many of pointing devices that specify the position of a cursor object are still adapted to specify the two-dimensional coordinates. Thus, there are not a few cases in which a pointing device that specifies the two-dimensional coordinates is used for a GUI of a three-dimensional space. In such cases, the cursor object is displayed while its coordinate in the depth direction is fixed, for example. Thus, a problem would arise that the display of the cursor object and objects arranged in the three-dimensional space would cause a sense of discomfort.

In light of the foregoing, it is desirable to provide an information processing device, a program, and an information processing method, which are novel and improved, and which can reduce a sense of discomfort caused by a pointing display in a three-dimensional space.

According to an embodiment of the present disclosure, there is provided an information processing device including a display control section which causes a three-dimensional space in which an object is arranged to be displayed on a display screen, an acquisition section which acquires a pointing operation in the three-dimensional space, and a position setting section which sets a pointing position in the three-dimensional space on the basis of the pointing operation. The display control section causes the pointing position to be displayed in the three-dimensional space, a difference between the pointing position and a position of the object in a depth direction of the display screen having been corrected.

The position setting section may set a provisional pointing position in the three-dimensional space on the basis of the pointing operation, and set the pointing position on a reference line passing through the provisional pointing position and a reference point set in the three-dimensional space.

The display control section may cause a pointing line passing through the pointing position to be displayed on the reference line.

The display control section may cause the pointing line to be displayed as a line segment that starts at the reference point and ends at the pointing position.

The display control section may cause a cursor object to be displayed at the pointing position.

The position setting section may set the pointing position at an intersection point between the object and the reference line.

The position setting section may select the object from among a plurality of objects each having an intersection point with the reference line, and set the pointing position at the intersection point between the selected object and the reference line.

The acquisition section may acquire an operation of switching a selection of the object, and the position setting section may switch the selected object on the basis of the operation of switching the selection of the object.

The position setting section may, when there is no intersection point between the object and the reference line, set the pointing position on the basis of a position(s) of one or more objects located around the reference line.

The acquisition section may acquire an operation of moving the reference point, and the position setting section may move the reference point on the basis of the operation of moving the reference point.

The display control section may cause a cursor object to be displayed at the pointing position with a blurred contour for visually correcting a difference in the depth direction.

The display control section may cause the three-dimensional space to be displayed on the display screen as a stereoscopic image.

According to another embodiment of the present disclosure, there is provided a program for causing a computer to execute the processes of causing a three-dimensional space in which an object is arranged to be displayed on a display screen, acquiring a pointing operation in the three-dimensional space, setting a pointing position in the three-dimensional space on the basis of the pointing operation, and causing the pointing position to be displayed in the three-dimensional space, a difference between the pointing position and a position of the object in a depth direction of the display screen having been corrected.

According to another embodiment of the present disclosure, there is provided an information processing method including causing a three-dimensional space in which an object is arranged to be displayed on a display screen, acquiring a pointing operation in the three-dimensional space, setting a pointing position in the three-dimensional space on the basis of the pointing operation, and causing the pointing position to be displayed in the three-dimensional space, a difference between the pointing position and a position of the object in a depth direction of the display screen having been corrected.

According to the embodiments of the present disclosure described above, a sense of discomfort caused by a pointing display in a three-dimensional space can be reduced.

DETAILED DESCRIPTION OF THE EMBODIMENTS

Figure 1:
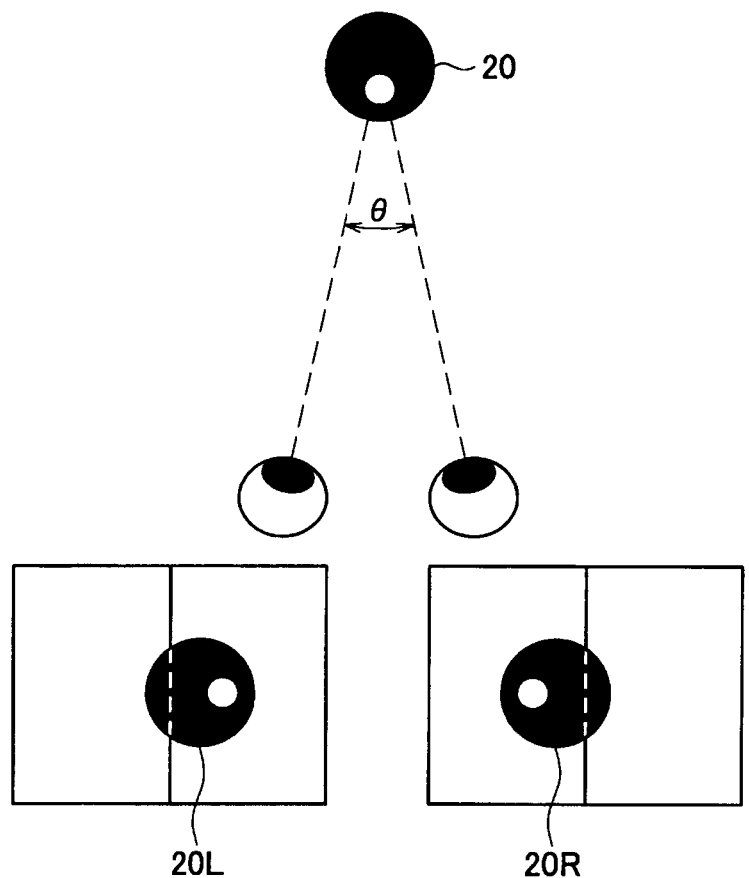
FIG. 1 is a diagram illustrating a stereoscopic image display.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. GUI of Three-Dimensional Space
2. First Embodiment
3. Second Embodiment
4. Third Embodiment
5. Fourth Embodiment
6. Fifth Embodiment
7. Sixth Embodiment
8. Conclusion (1. GUI of Three-Dimensional Space)

First, a GUI of a three-dimensional space that is displayed in each embodiment of the present disclosure described below will be described. A GUI of a three-dimensional space displays a virtual three-dimensional space on a display screen. Objects representing content such as, for example, music or movies, icons such as operation buttons, and the like are arranged in the three-dimensional space. A user selects a desired object from among the displayed objects through a pointing operation using, for example, a pointing device. In such a case, the user selects a desired object by moving a pointing position in the three-dimensional space through a pointing operation and then performing an operation of selecting the object in a state in which the pointing position is overlaid on the object.

As used herein, the "pointing position" refers to a position that is pointed in a three-dimensional space through a pointing operation. In the three-dimensional space, the pointing position is displayed such that it can be identified by a user who performs a pointing operation. To display the pointing position, an arrow-shaped cursor object can be used, for example.

Such a GUI of a three-dimensional space can be displayed as either a planar image or a stereoscopic image on the display screen. Hereinafter, a stereoscopic image display method that can be used for a display of a GUI of a three-dimensional space will be described with reference to FIGS. 1 to 4.

FIG. 1 shows a mechanism in which an observer stereoscopically recognizes an object 20 existing in a real space by viewing it with the left eye and the right eye. In the example shown in the drawing, the object 20 is viewed with an angle of convergence θ. Herein, the angle of convergence θ is the intersection angle of the lines of sight of the left eye and the right eye. Due to this angle of convergence θ, images of the object 20 that are observed with the left eye and the right eye have a difference as can be seen in an image 20L and an image 20R. The observer stereoscopically recognizes the object 20 using such a difference.

Figure 2:
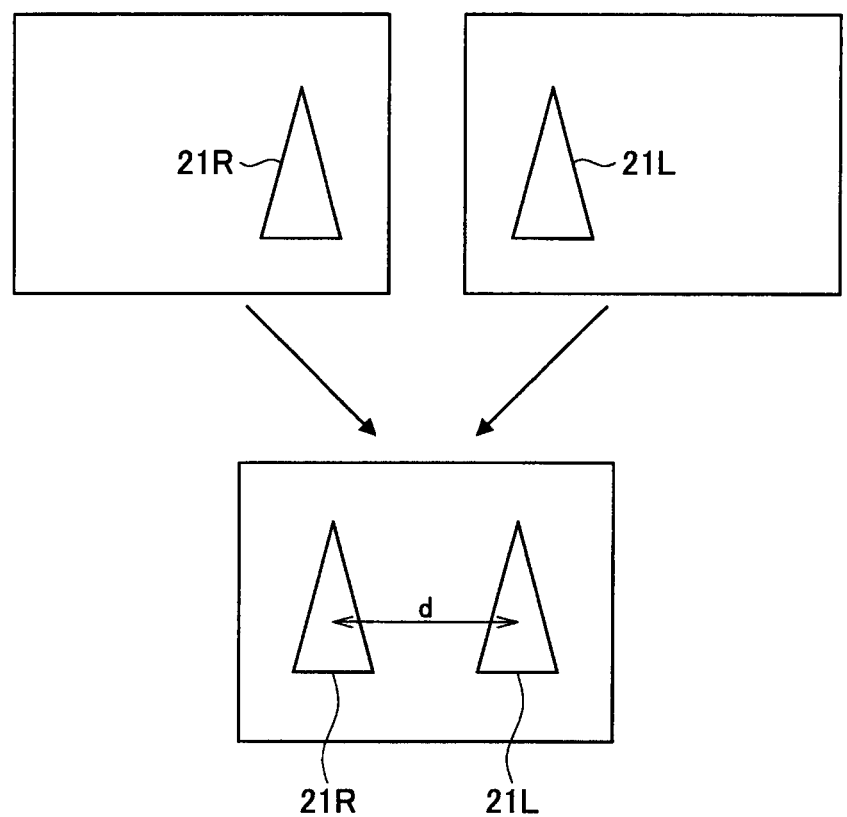
FIG. 2 is a diagram illustrating a stereoscopic image display.

FIG. 2 shows parallax set on an object 21 that is presented as an image. In the example shown in the drawing, parallax d is set between an object 21L and an object 21R that are presented to the left eye and the right eye, respectively, of an observer to make the observer stereoscopically recognize the object 210.

Figure 3:
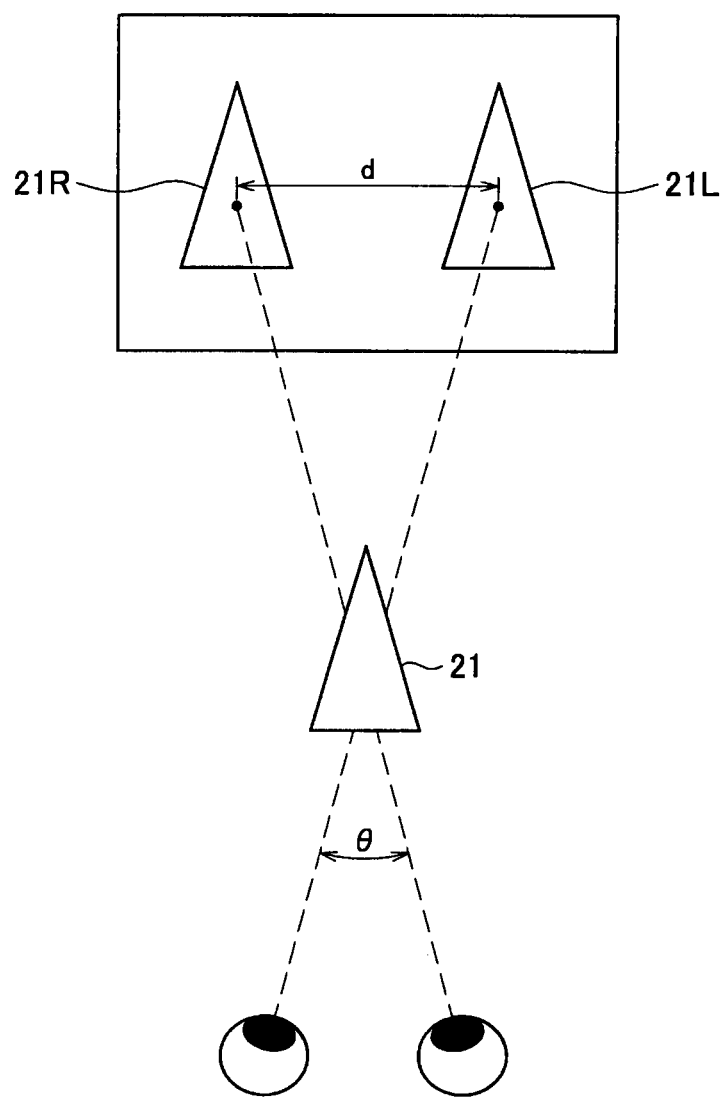
FIG. 3 is a diagram illustrating a stereoscopic image display.

FIG. 3 shows a mechanism in which an observer stereoscopically recognizes the object 21 by viewing it with the left eye and the right eye. In the example shown in the drawing, the object 21L and the object 21R are presented to the left eye and the right eye, respectively, of the observer, whereby that the angle of convergence θ occurs between the lines of sight of the left eye and the right eye of the observer of the object 21. Thus, the observer feels as if the object 21 is popping out ahead of the screen.

Figure 4:
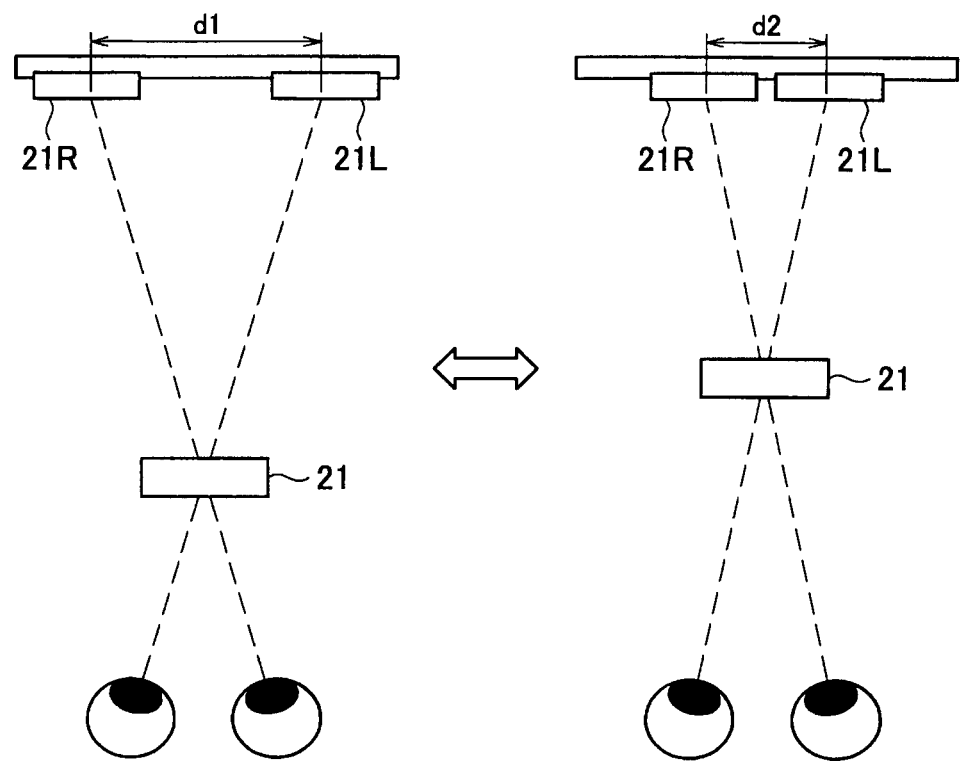
FIG. 4 is a diagram illustrating a stereoscopic image display.

FIG. 4 shows the relationship between the parallax d set between the object 21L and the object 21R and the position of the object 21 recognized by the observer. In the example shown in the drawing, when parallax d1 is set, the observer views the object 21 with an angle of convergence θ1. Meanwhile, when parallax d2 that is smaller than the parallax d1 is set, the observer views the object 21 with an angle of convergence θ2 that is smaller than the angle of convergence θ1. The smaller the angle of convergence θ1, the deeper the object 21 that the observer feels. Therefore, when the parallax d2 is set, the observer feels as if the object 21 is located at a deeper position than when the parallax d1 is set.

As described above, a stereoscopic image is displayed with parallax provided for images of an object that are presented to the left eye and the right eye, respectively, of an observer, and the position of the object in the depth direction recognized by the observer is influenced by the parallax set on the images of the object.

Described next is a case in which a cursor object and an object have a difference in the depth direction in a GUI of a three-dimensional space. As described above, a cursor object may be used to select an object in a GUI of a three-dimensional space. In such a case, the cursor object is moved in the three-dimensional space through an operation using a pointing device of a user, and is then overlaid on an object desired by the user. However, the pointing device is adapted to specify the two-dimensional coordinates, for example. Thus, if the coordinate in the depth direction of the cursor object is fixed or if a coordinate in the depth direction specified by the pointing device does not match the coordinate in the depth direction of the object, a difference in the depth direction can occur between the cursor object and the object. Such a case will be hereinafter described with reference to FIG. 5.

Figure 5:
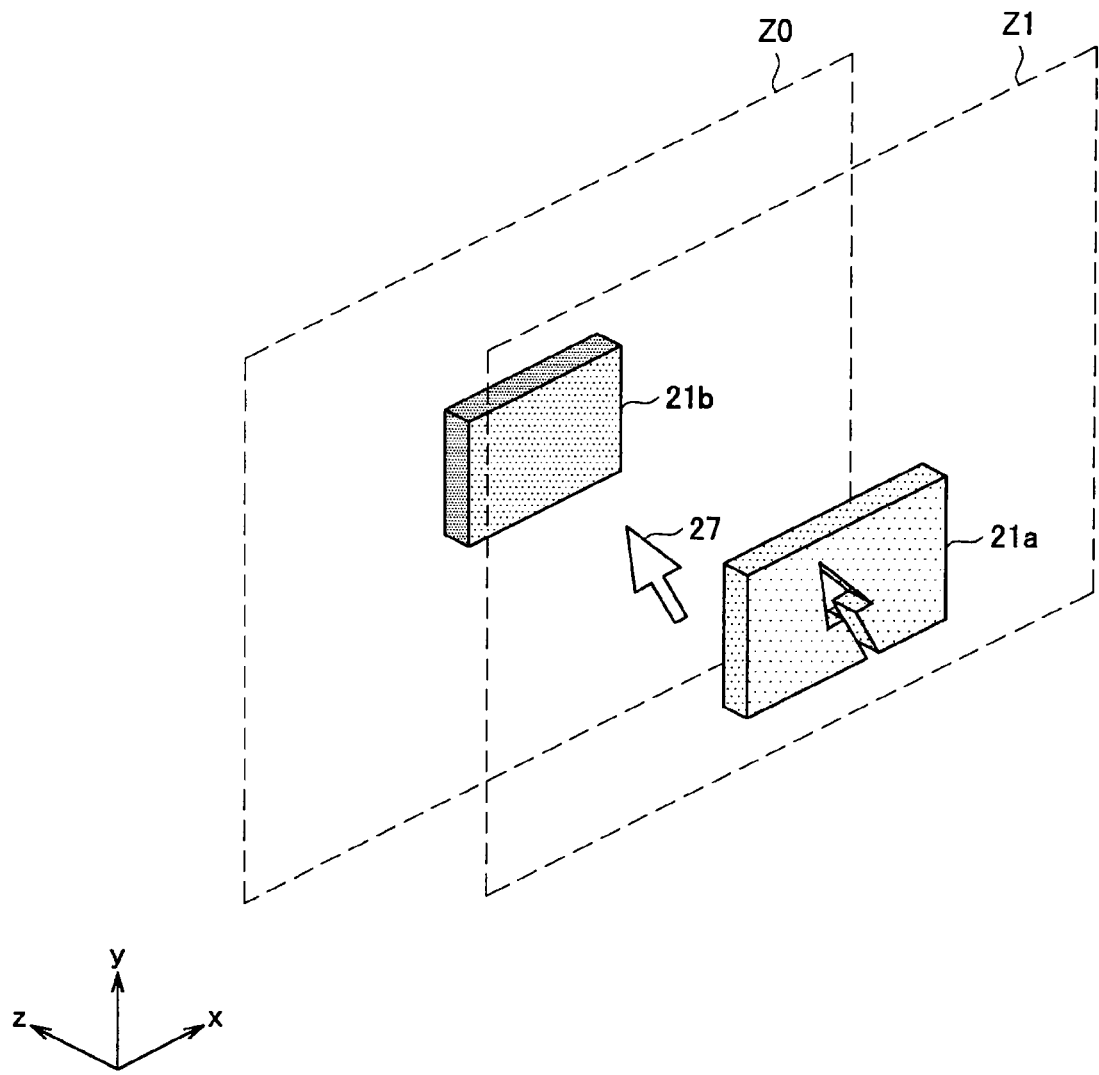
FIG. 5 is a diagram illustrating a display of a pointing position in a three-dimensional space.

FIG. 5 shows objects 21a and 21b and a cursor object 27 displayed in a three-dimensional space. In the three-dimensional space, the x-axis, the y-axis, and the z-axis are set on the horizontal direction, the vertical direction, and the depth direction, respectively, of a display screen. A plane Z0 and a plane Z1 are planes that are perpendicular to the z-axis. Herein, points that are included in the plane Z0 have the same z-coordinates, and points that are included in the plane Z1 have the same z-coordinates. Meanwhile, points that are included in the plane Z0 and points that are included in the plane Z1 have different coordinates in the z-axis direction. In the example shown in the drawing, the object 21a is located on the plane Z1 and the object 21b is located on the plane Z0.

The cursor object 27 represents a pointing position in the three-dimensional space. In the example shown in the drawing, the pointing position is operated by a pointing device that specifies the two-dimensional coordinates including the x-coordinate and the y-coordinate. Therefore, the z-coordinate of the pointing position is fixed to the z-coordinate of the plane Z0. Thus, the cursor object 27 moves in the x-axis direction or the y-axis direction on the plane Z0 in accordance with a pointing operation. A user selects the object 21 by performing a selection operation in a state which the cursor object 27 and the object 21 overlap each other in the x-coordinate and the y-coordinate. In the state shown in the drawing, the cursor object 27 and the object 21a are in a state of overlapping each other in the x-coordinate and the y-coordinate, that is, a state in which the object 21a can be selected by the cursor object 27.

However, the cursor object 27 on the plane Z0 has a different z-coordinate from the object 21a on the plane Z1. Thus, if the cursor object 27 is displayed such that it is overlaid on the object 21a, the cursor object 27 is displayed such that it sinks into the rear side from the surface of the object 21a. As the user is performing a pointing operation for overlaying the cursor object 27 on the object 21a, it is highly probable that such a display of the cursor object 27 and the object 21a will cause a sense of discomfort.

In particular, when the three-dimensional space is displayed as a stereoscopic image in the aforementioned state, parallax set on the cursor object 27 is parallax corresponding to the z-coordinate of the plane Z0, and parallax set on the object 21a is parallax corresponding to the z-coordinate of the plane Z1. Thus, as the contradictory parallax is set on the two objects that should be overlaid on top of each other, it is highly probable that the user may feel a strong sense of discomfort.

Each embodiment of the present disclosure includes a configuration in which the difference in the z-axis direction between a display of a pointing position and a display of an object, which may cause a sense of discomfort to a user with high possibility as described above, is corrected.

(2. First Embodiment)

Next, the first embodiment of the present disclosure will be described. In this embodiment, in a three-dimensional space 200 of a GUI, a pointing position 250 is set on a reference line 240 that passes through a provisional pointing position 220, which is set on the basis of a pointing operation of a user, and a reference point 230. Then, a pointing line 260 that passes through the pointing position is displayed. In the following description, the function and configuration of an information processing device 100 in accordance with this embodiment will be described with reference to FIG. 6, and then, the setting and display of the pointing position 250 in accordance with this embodiment will be described with reference to FIGS. 7 and 8.

Figure 6:
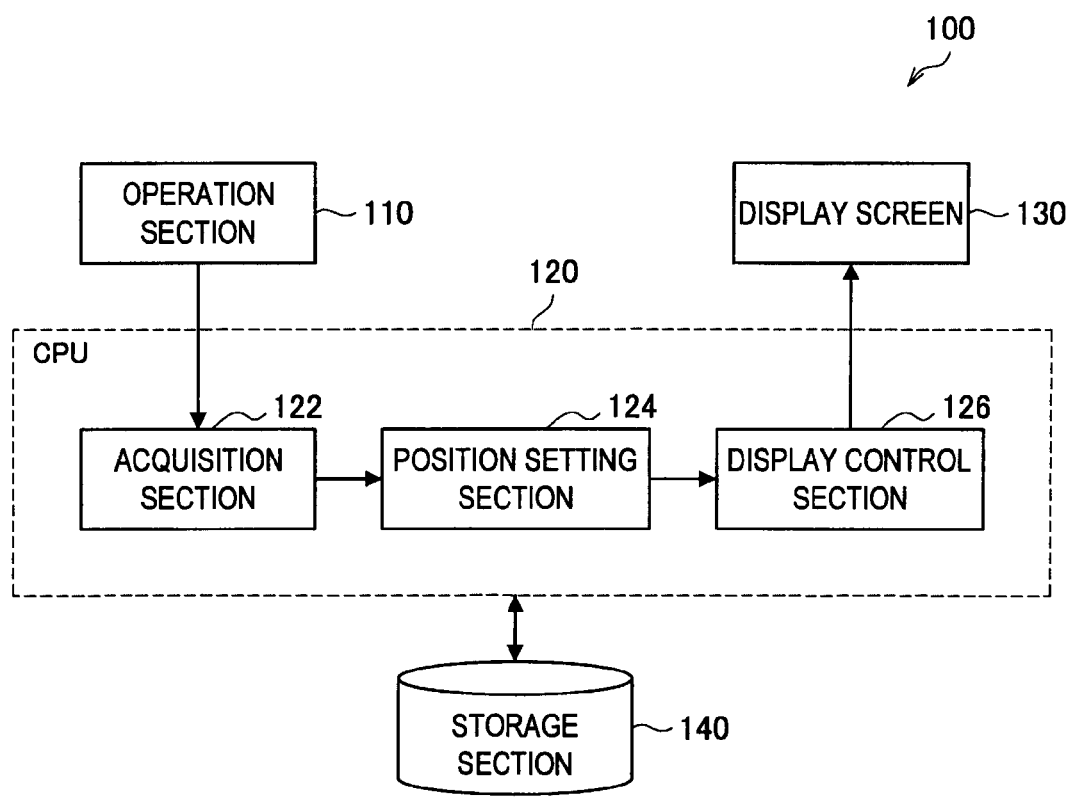
FIG. 6 is a block diagram showing the function and configuration of an information processing device in accordance with the first embodiment of the present disclosure.

FIG. 6 is a block diagram showing the function and configuration of the information processing device 100 in accordance with the first embodiment of the present disclosure. Referring to FIG. 6, the information processing device 100 includes the functions of an operation section 110, a CPU (Central Processing Unit) 120, a display screen 130, and a storage section 140. The CPU 120 includes the functions of an acquisition section 122, a position setting section 124, and a display control section 126.

Among the components included in the information processing device 100 in this embodiment, the operation section 110, the display screen 130, and the storage section 140 can be provided independently of the information processing device 100. For example, the operation section 110 can be another operation device connected to the information processing device 100 via a USB (Universal Serial Bus) or the like. In addition, the display screen 130 can be provided as, for example, a display device connected to the information processing device 100 via an HDMI (High-Definition Multimedia Interface), a DVI (Digital Visual Interface), or the like. Further, the storage section 140 can be a storage device on a network connected to the information processing device 100 via a network such as a LAN (Local Area Network) or the Internet.

The operation section 110 converts a pointing operation in the three-dimensional space 200 into a signal and transmits the signal to the acquisition section 122. In this embodiment, the operation section 110 is a pointing device that specifies the two-dimensional coordinates such as, for example, a mouse, a touch pad, or a touch panel. However, the operation section 110 can be a pointing device that specifies the three-dimensional coordinates such as, for example, a three-dimensional mouse or a remote controller unit using infrared rays. Herein, the three-dimensional space 200 is a three-dimensional space in which objects 210, which represent content such as, for example, music or movies, icons such operation buttons, and the like, are arranged. The operation section 110 converts a pointing operation of a user for selecting a desired object from among the objects 210, for example, into a signal, and then transmits the signal to the acquisition section 122.

The CPU 120 is an arithmetic processing device for controlling the operation of the information processing device 100. The CPU 120 operates in accordance with programs stored in the storage section 140, for example, to execute a variety of arithmetic processing for controlling the operation of the information processing device 100. For the arithmetic processing of the CPU 120, DRAM (Dynamic Random Access Memory) included in the storage section 140 can be used, for example. Programs for operating the CPU 120 can be provided to the information processing device 100 by being stored in a removable storage medium such as, for example, a disc storage medium or a memory card. Alternatively, the programs can be downloaded to the information processing device 100 via a network such as a LAN or the Internet. The CPU 120 implements each function of the acquisition section 122, the position setting section 124, and the display control section 126.

The acquisition section 122 receives a signal from the operation section 110 to acquire a pointing operation in the three-dimensional space 200. In this embodiment, the operation section 110 is a pointing device for specifying the two-dimensional coordinates. Thus, the pointing operation acquired by the acquisition section 122 is an operation of specifying the two-dimensional coordinates such as, for example, the x-coordinate and the y-coordinate. However, when the operation section 110 is a pointing device for specifying the three-dimensional coordinates, the operation acquired by the acquisition section 122 can be an operation of specifying the three-dimensional coordinates such as, for example, the x-coordinate, the y-coordinate, and the z-coordinate.

The position setting section 124 sets the pointing position 250 in the three-dimensional space 200 on the basis of the pointing operation acquired by the acquisition section 122, and provides the positional information of the pointing position 250 to the display control section 126. In this embodiment, the position setting section 124 first sets the provisional pointing position 220 in the three-dimensional space 200 on the basis of the acquired pointing operation. Next, the position setting section 124 sets the pointing position 250 on a reference line that passes through the provisional pointing position 220 and the reference point 230 set in the three-dimensional space. The setting of the pointing position 250 by the position setting section 124 is described below.

The display control section 126 transmits an image signal to the display screen 130, and displays the three-dimensional space 200 in which the objects 210 are arranged. The display control section 126 displays the pointing position in the three-dimensional space 200 on the basis of the positional information of the pointing position 250 provided by the position setting section 124. At this time, the pointing position 250 is displayed such that the difference between the pointing position 250 and the object 210 in the depth direction of the display screen 130 is corrected. The display of the pointing position 250 by the display control section 126 is described below.

The display screen 130 receives the image signal from the display control section 126, and displays the three-dimensional space 200 in which the objects 210 are arranged. The display screen 130 can be, for example, an LCD (Liquid Crystal Display), a PDP (Plasma Display Panel), or an organic EL (Electro-Luminescence) panel. In the three-dimensional space 200 displayed on the display screen 130, the x-axis direction, the y-axis direction, and the z-axis direction are defined as the horizontal direction, the vertical direction, and the depth direction, respectively, of the display screen 130. The display of the three-dimensional space 200 is described below.

The storage section 140 stores data about processes of the information processing device 100. The storage section 140 can be, for example, semiconductor memory such as ROM (Read Only Memory) or a DRAM; an optical disc such as BD (Blu-ray Disc), DVD (Digital Versatile Disc), or CD (Compact Disc); or a hard disk. The storage section 140 can be a storage device built in the information processing device 100 or a removable medium such as a memory card that can be attached to and detached from the information processing device 100. Further, the storage section 140 can include a plurality of types of storage devices or removable media. In the storage section 140, image data used to display a three-dimensional space of a GUI is stored, for example, and further, programs for operating the CPU 120 can also be stored.

Figure 7:
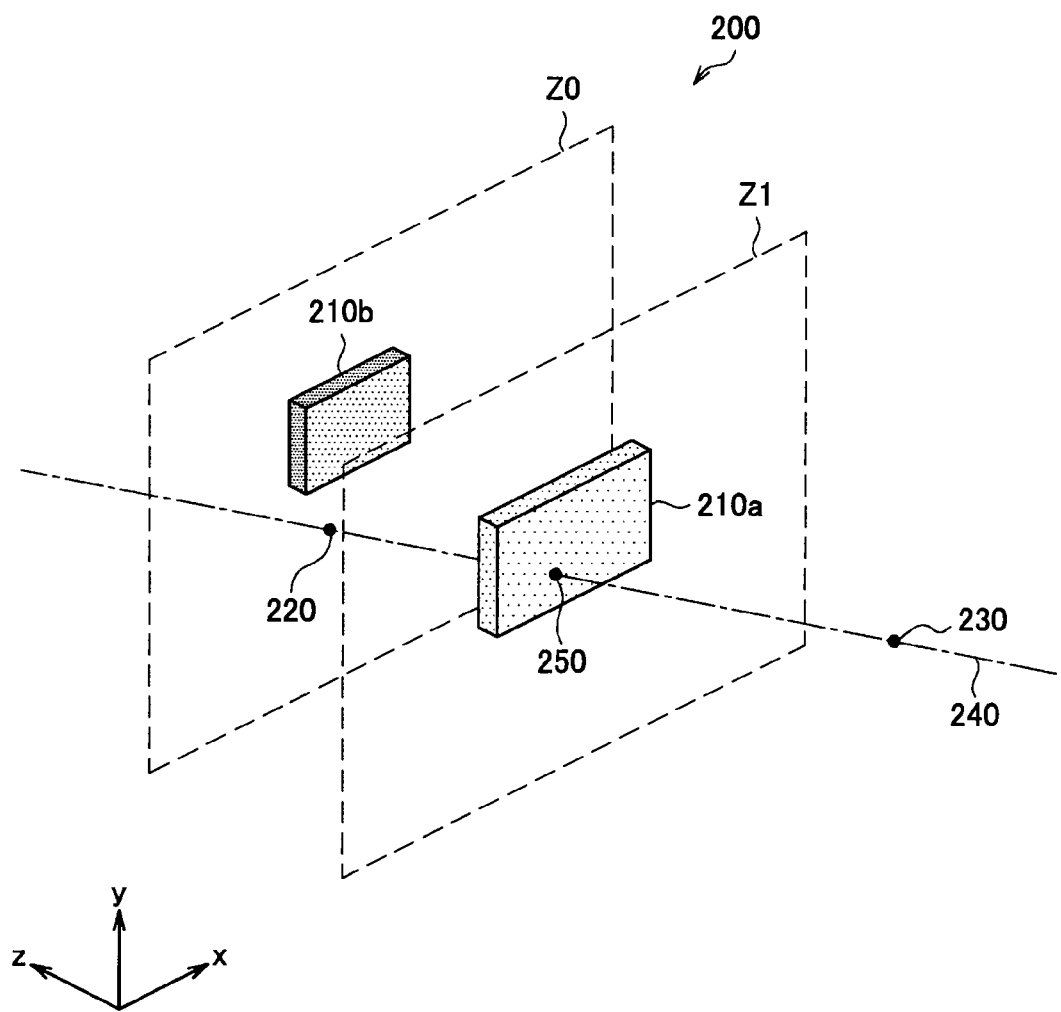
FIG. 7 is a diagram illustrating the setting of a pointing position in the first embodiment.

FIG. 7 is a diagram illustrating the setting of the pointing position 250 in the first embodiment of the present disclosure. Referring to FIG. 7, objects 210a and 210b are displayed in the three-dimensional space 200. The pointing position 250 is set on the reference line 240 that passes through the provisional pointing position 220 and the reference point 230. In the example shown in the drawing, the pointing position 250 is set on the surface of the object 210a and the reference line 240.

The three-dimensional space 200 is a three-dimensional space displayed as a GUI on the display screen 130. In the three-dimensional space 200, the x-axis direction, the y-axis direction, and the z-axis direction are defined as shown. Among them, the x-axis direction is the horizontal direction of the display screen 130, the y-axis direction is the vertical direction of the display screen 130, and the z-axis direction is the depth direction of the display screen 130. Herein, each of the plane Z0 and the plane Z1 is shown as a plane representing regions whose coordinates in the z-axis direction are equal. The plane Z0 and the plane Z1 have different coordinates in the z-axis direction.

The objects 210 are objects that are arranged in the three-dimensional space 200 and that represent content such as, for example, music or movies, icons such as operation buttons, and the like on the GUI. The plurality of objects 210 can be arranged at different positions in the x-axis direction, the y-axis direction, and the z-axis direction. In the example shown in the drawing, the object 210a is located on the plane Z1 and the object 210b is located on the plane Z0. As described above, as the plane Z0 and the plane Z1 have different coordinates in the z-axis direction, the z-coordinate of the object 210a and the z-coordinate of the object 210b also differ.

The provisional pointing position 220 is set on the basis of a pointing operation acquired by the acquisition section 1220. In this embodiment, the pointing operation acquired by the acquisition section 122 is an operation of specifying the two-dimensional coordinates. Therefore, the z-coordinate of the provisional pointing position 220 is fixed at the z-coordinate of the plane Z0. Note that the two-dimensional coordinates specified by the pointing operation herein are the x-coordinate and the y-coordinate. The position setting section 124 sets the provisional pointing position 220 on a point having the x-coordinate and the y-coordinate specified by the pointing operation on the plane Z0.

The reference point 230 is a point set in the three-dimensional space 200 as a reference for setting the pointing position 250. The reference point 230 can be set at a position recognized by the user as the position of his/her hand in the three-dimensional space 200, that is, a position that is displaced from the position at which the viewpoint of the user is set in the three-dimensional space 200 in the negative direction along the y-axis. In this embodiment, the reference point 230 is a point set in advance by the position determination section 124. Note that the reference point 230 need not necessarily be set within the range in which the reference point 230 is displayed on the display screen 130, and can be set outside the range in which the reference point 230 is displayed on the display screen 130.

The reference line 240 is a line that passes through the provisional pointing position 220 and the reference point 230. In this embodiment, the reference line 240 is set as a straight line. The position setting section 124 sets the pointing position 250 on the reference line 240. In this embodiment, the position setting section 124 sets the pointing position 250 at the intersection point between the object 210 and the reference line 240. For example, the position setting section 124 calculates the intersection point between the plane Z on which the object 210 is located and the reference line 240 from the direction vector of the reference line 240 and the coordinates of each vertex of the object 210, using an intersection determination algorithm of Tomas Moller, and if the intersection point is within the range of the x-coordinate and the y-coordinate of the object 210, the position setting section 124 sets the intersection point as the pointing position 250.

Herein, if the object 210 has moved, for example, the position setting section 124 can reset the pointing position 250 on the basis of the position of the moved object 210. In such a case, the pointing position 250 dynamically changes in accordance with the movement of the object 210.

In the example shown in the drawing, the intersection point between the plane Z1 on which the object 210a is located and the reference line 240 is within the range of the x-coordinate and the y-coordinate of the object 210a. Therefore, the pointing position 250 is set at the intersection point between the plane Z1 and the reference line 240, namely, the intersection point between the object 210a and the reference line 240. Meanwhile, if there is no intersection point between the object 210 and the reference line 240 in this embodiment, the position setting section 124 sets the provisional pointing position 220 as the pointing position 250.

The intersection determination algorithm of Tomas Moller used for the aforementioned process of the position setting section 124 is described in, for example, "Tomas Moller, 'Practical Analysis of Optimized Ray-Triangle Intersection', [online], [searched on Aug. 31, 2010], the Internet (URL: http://www.cs.lth.se/home/Tomas_Akenine_Moller/raytri/)."

Figure 8:
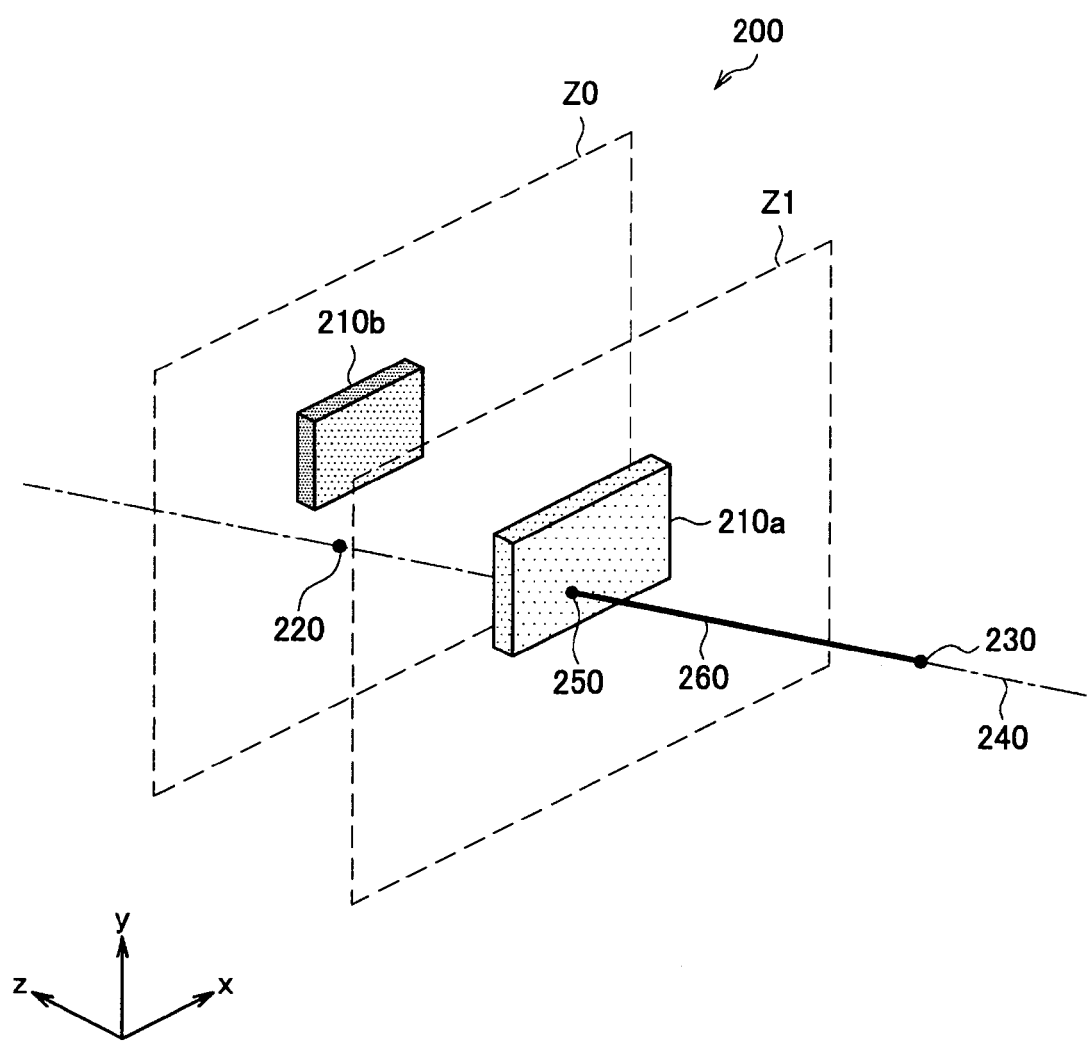
FIG. 8 is a diagram showing a display example of a pointing position in the first embodiment.

FIG. 8 is a diagram showing a display example of the pointing position 250 in the first embodiment of the present disclosure. Referring to FIG. 8, the pointing line 260 that passes through the pointing position 250 is displayed in the three-dimensional space 200.

The pointing line 260 is a line that passes through the pointing position 250. In the example shown in the drawing, the pointing line 260 is displayed by the display control section 126 as a line segment that starts at the reference point 230 and ends at the pointing position 250. In such a case, the user is able to recognize the pointing position 250 as an end point of the line segment displayed as the pointing line 260. Note that the pointing line 260 need not necessarily be displayed entirely on the display screen 130. For example, when the reference point 230 is set outside the range in which the reference point 230 is displayed on the display screen 130, the pointing line 260 is also partly located outside the range in which the pointing line 260 is displayed on the display screen 130. Thus, the pointing line 260 can be displayed such that it is cut at the end of the display screen 130.

Herein, when the three-dimensional space 200 is displayed as a stereoscopic image on the display screen 130, parallax is set not only on the object 210 but also on the pointing line 260. The value of the parallax set on the pointing line 260 can be a value that linearly changes from the value of parallax corresponding to the z-coordinate of the reference point 230 to the value of parallax corresponding to the z-coordinate of the pointing position 250. In the example shown in the drawing, the pointing position 250 is set at the intersection point between the object 210a on the plane Z1 and the reference line 240. The pointing position 250 and the object 210a to be pointed are both located on the plane Z1. Thus, each of the parallax set on the pointing line 260 at the pointing position 250 and the parallax set on the object 210a is the parallax corresponding to the z-coordinate of the plane Z1. Thus, there is no contradiction between the parallax of the object 210a and the parallax of the pointing line 260, so that a sense of discomfort felt by the user is reduced.

Meanwhile, if there is no intersection point between the object 210 and the reference line 240 and the provisional pointing position 220 is set as the pointing position 250, the pointing line 260 can be displayed as a line segment that starts at the reference point 230 and ends at the pointing position 250 as in the aforementioned case. Alternatively, in this case, the pointing line 260 can be displayed as a half line that extends from the reference point 230 over an infinite distance through the pointing position 250 set at the provisional pointing position 220.

(3. Second Embodiment)

Next, the second embodiment of the present disclosure will be described. In this embodiment, a cursor object 270 is displayed at the pointing position 250. In the following description, a display of the pointing position 250 in accordance with this embodiment will be described with reference to FIGS. 9 and 10. Note that this embodiment differs from the first embodiment in that the cursor object 270 is displayed instead of or in addition to the pointing line 260. However, as the other functions and configurations are approximately the same as those in the first embodiment, detailed description thereof will be omitted.

Figure 9:
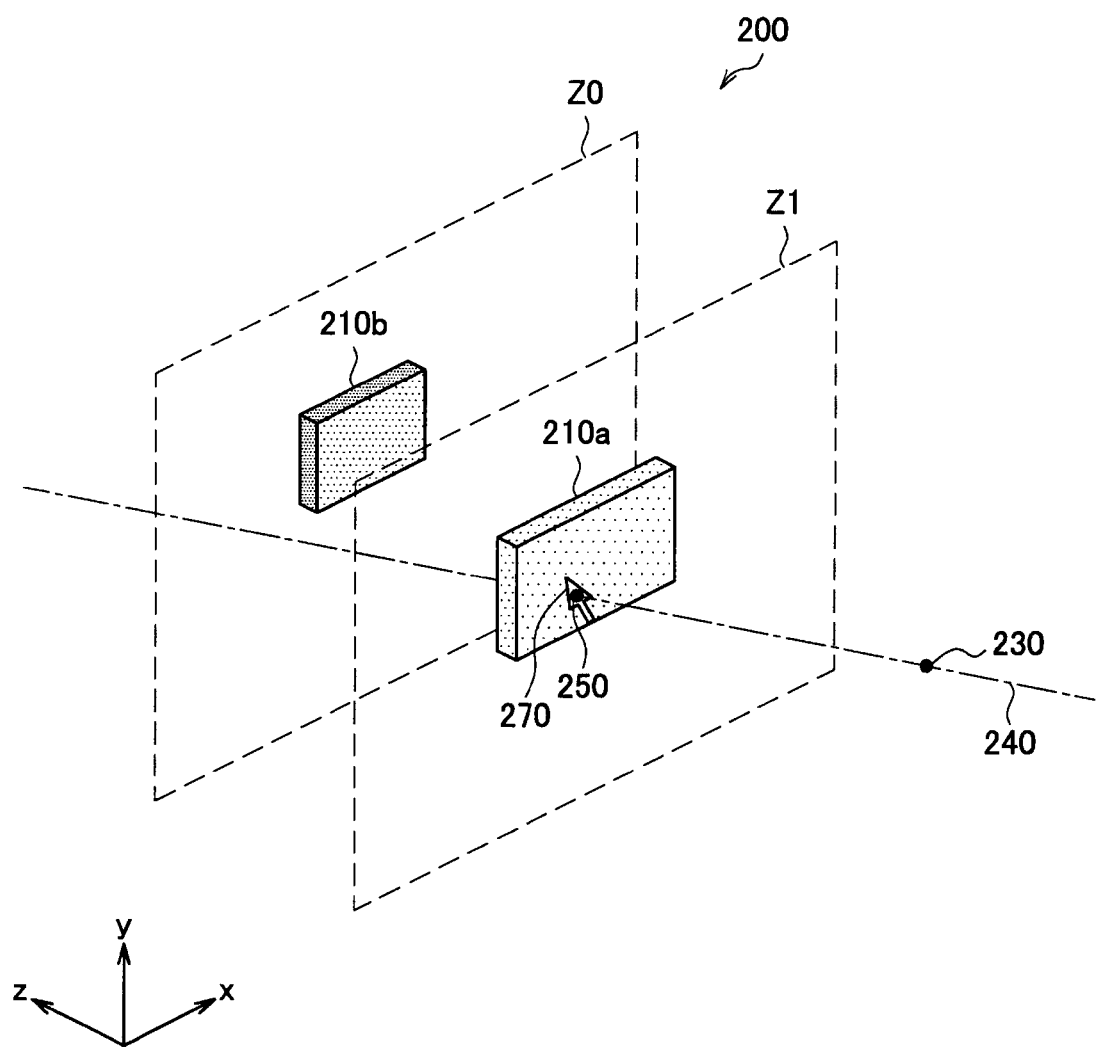
FIG. 9 is a diagram showing a display example of a pointing position in the second embodiment of the present disclosure.

FIG. 9 is a diagram showing a display example of the pointing position 250 in the second embodiment of the present disclosure. Referring to FIG. 9, the cursor object 270 is displayed at the pointing position 250 in the three-dimensional space 200.

The cursor object 270 is displayed by the display control section 126 as an arrow-shaped object, for example, as shown. Note that the cursor object 270 need not necessarily be an arrow-shaped object, and can be an object with various shapes such as a circle, triangle, or polygon. In addition, the shape of the cursor object 270 need not necessarily be a planar shape as shown, and can be a stereoscopic shape. With the cursor object 270 displayed, the user is able to recognize the pointing position 250 as a position where the cursor object 270 is displayed. Note that in order to show the pointing position 250, the pointing line 260 described in the first embodiment can also be displayed in addition to the cursor object 270.

Figure 10:
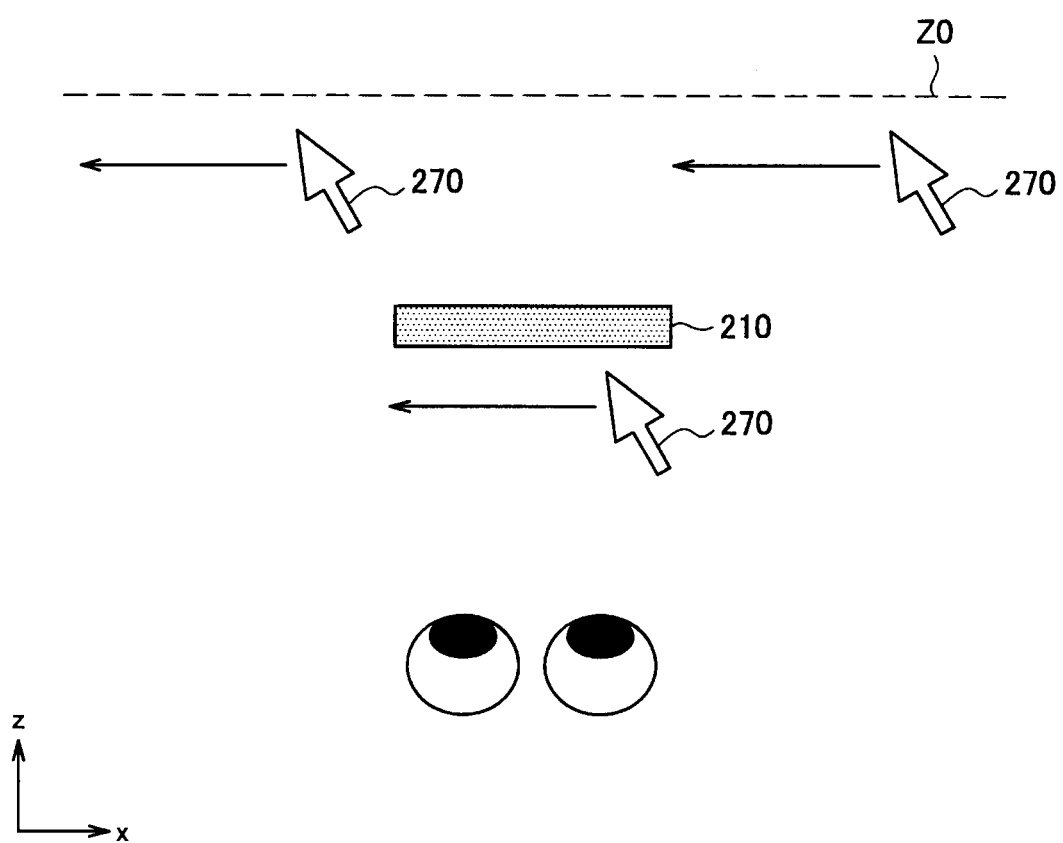
FIG. 10 is a diagram illustrating a display of the depth of the pointing position in second embodiment.

FIG. 10 is a diagram illustrating a display of the depth of the pointing position 250 in the second embodiment of the present disclosure. Referring to FIG. 10, the cursor object 270 is, when its position in the x-axis direction overlaps the object 210, displayed at the same position in the z-axis direction as the object 210. Although the x-axis direction and the z-axis direction are shown in the drawing for simplicity, the same is true for a case in which the y-axis direction is included.

As the pointing position 250 is set and the cursor object 270 is displayed at the pointing position 250 as described above, the cursor object 270 is displayed at a position corresponding to the object 210 in the z-axis direction, namely, the depth direction of the display screen 130. Thus, when the object 210 and the cursor object 270 are displayed such that the cursor object 270 is overlaid on the object 210, the cursor object 270 is displayed such that it is positioned on the surface of the object 210. Therefore, when the three-dimensional space 200 is displayed as a stereoscopic image on the display screen 130, parallax set on the cursor object 270 has similar value as parallax set on the object 210. Thus, no contradiction occurs between the parallax of the object 210 and the parallax of the cursor object 270 in the stereoscopic image, and thus a sense of discomfort felt by the user is reduced.

Meanwhile, when there is no intersection point between the object 210 and the reference line 240 and the provisional pointing position 220 is set as the pointing position 250, the cursor object 270 is displayed on the plane Z0 on which the provisional pointing position 220 is set. Note that in such a display, there is a possibility that the z-coordinate, namely, the depth of the cursor object 270 may abruptly change depending on the difference between the z-coordinates of the plane Z0 and the object 210, which could cause a sense of discomfort to the user. In such a case, the third embodiment described below can be advantageously used.

(4. Third Embodiment)

Next, the third embodiment of the present disclosure will be described. In this embodiment, when there is no intersection point between the object 210 and the reference line 240, the pointing position 250 is set on the basis of the position(s) of one or more objects 210 located around the reference line 240. In the following description, a display of the pointing position 250 in accordance with this embodiment will be described with reference to FIGS. 11 and 12. Note that this embodiment differs from the second embodiment in the setting of the pointing position 250 when there is no intersection point between the object 210 and the reference line 240.

However, as the other functions and configurations are approximately the same as those in the second embodiment, detailed description thereof will be omitted.

Figure 11:
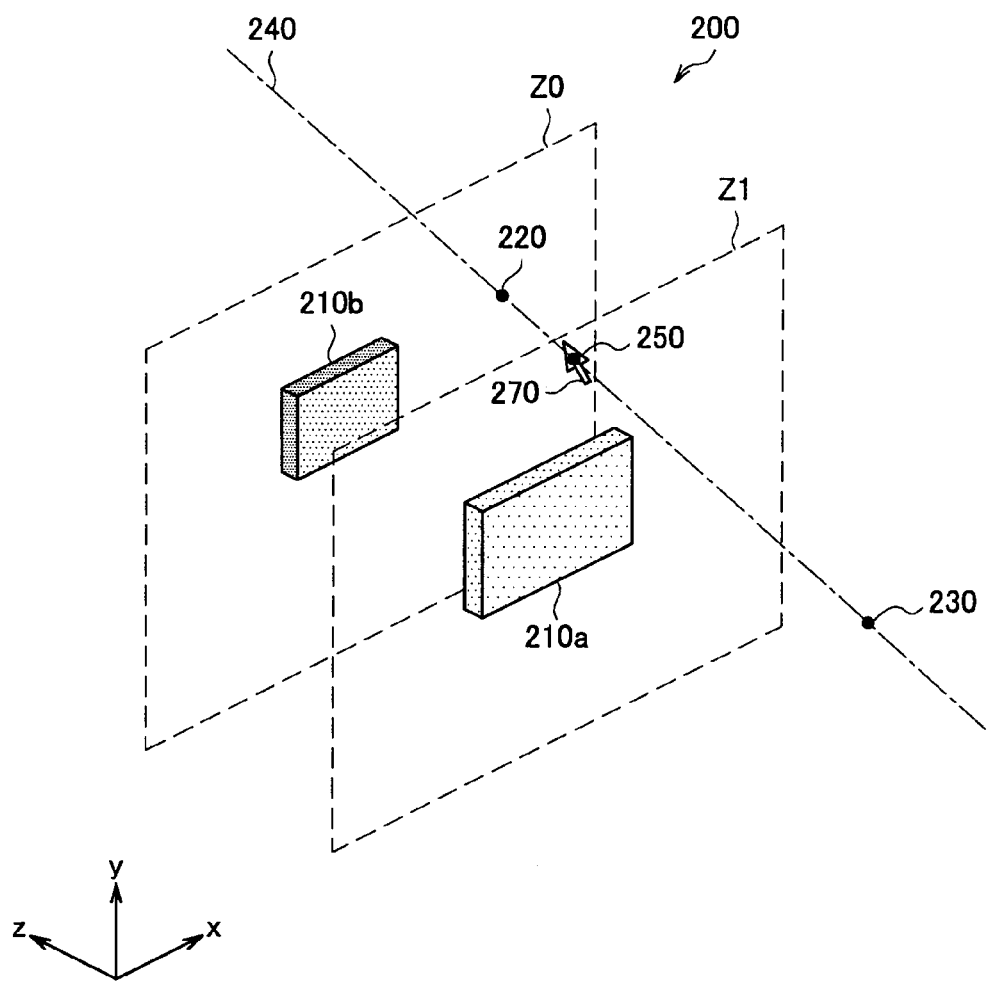
FIG. 11 is a diagram illustrating the setting of a pointing position in the third embodiment of the present disclosure.

FIG. 11 is a diagram illustrating the setting of the pointing position 250 in the third embodiment of the present disclosure. Referring to FIG. 11, when there is no intersection point between the object 210 and the reference line 240, the pointing position 250 is set on the basis of the positions of an object 210a and an object 210b located around the reference line 240.

In the example shown in the drawing, the reference line 240 that is set as a straight line passing through the provisional pointing position 220 and the reference point 230 does not have an intersection point with the object 210a or the object 210b displayed in the three-dimensional space 200. Thus, the position setting section 124 sets the pointing position 250 on the basis of the positions of the object 210a and the object 210b located around the reference line 240. Specifically, the position setting section 124 sets the pointing position 250 on the reference line 240 at a position between the plane Z1 on which the object 210a is located and the plane Z0 on which the object 210b is located. The display control section 126 displays the cursor object 270 at the thus set pointing position 250.

As the pointing position 250 is set and the cursor object 270 is displayed at the pointing position 250 as described above, it is possible to, when the pointing position 250 has shifted state from the state shown in the drawing to a state in which the pointing position 250 overlaps any of the objects 210, reduce a sense of discomfort felt by the user for the change in the display of the cursor object 270. For example, when the provisional pointing position 220 has moved through a pointing operation of the user and changed state from the state shown in the drawing to a state in which the reference line 240 has an intersection point with the object 210a, the pointing position 250 is set at the intersection point between the reference line 240 and the object 210a. In such a case, a change in the z-coordinate, namely, the depth of the cursor object 270 is more moderate when the cursor object 270 displayed at the pointing position 250 moves from the midpoint between plane Z0 and the plane Z1 to the plane Z1 as in this embodiment than when the cursor object 270 moves from the plane Z0 to the plane Z1, so that a sense of discomfort felt by the user for the display can be reduced.

Figure 12:
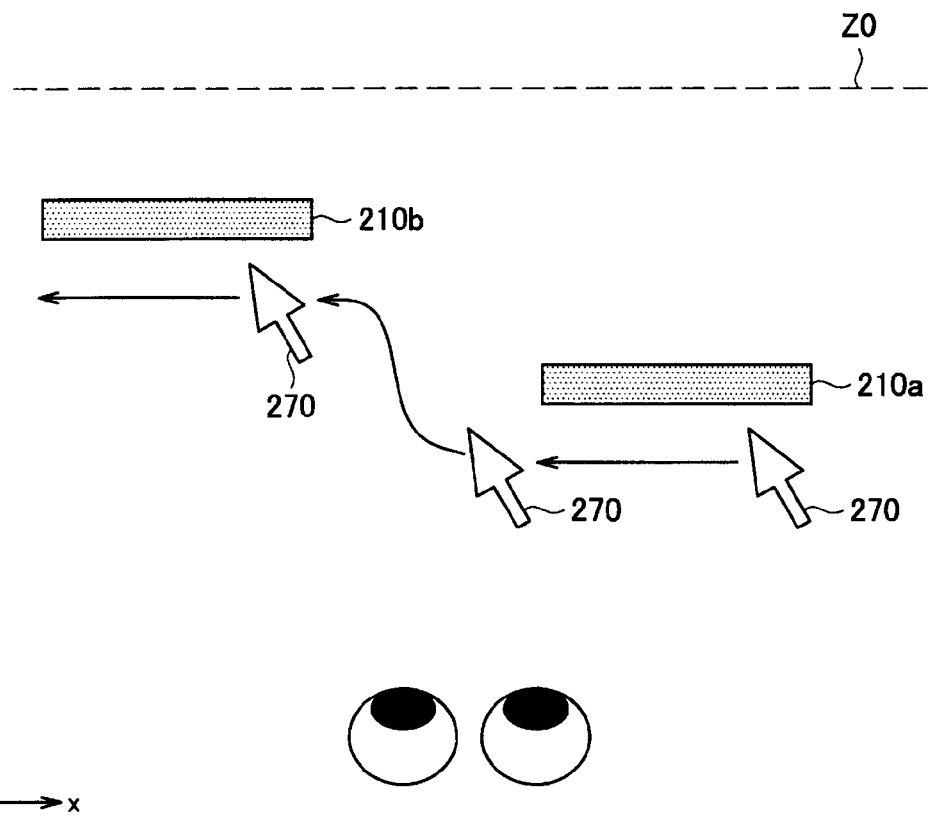
FIG. 12 is a diagram illustrating a display of the depth of the pointing position in the third embodiment.

FIG. 12 is a diagram illustrating a display of the depth of the pointing position in the third embodiment of the present disclosure. Referring to FIG. 12, the z-coordinate of the cursor object 270 continuously changes between the object 210a and the object 210b having different z-coordinates. Although the x-axis direction and the z-axis direction are shown in the drawing for simplicity, the same is true for a case in which the y-axis direction is included.

In the example shown in the drawing, the pointing position 250 moves from the object 210a to the object 210b as the x-coordinate of the pointing position 250 changes in the negative direction. The position of the object 210a and the position of the object 210b are not continuous in the x-axis direction. Therefore, the position setting section 124 sets the pointing position 250 such that the z-coordinate thereof changes continuously in a portion between the object 210a and the object 210b on the basis of the z-coordinates of the object 210a and the object 210b. Consequently, the z-coordinate of the cursor object 270 displayed at the pointing position 250 changes continuously between the object 210 and the object 210b. When the cursor object 270 is displayed in this manner, it is possible to prevent the cursor object 270 from being displayed such that its depth changes abruptly as a result of the cursor object 270 having moved to the plane Z0 in the gap between the object 210a and the object 210b. Thus, a sense of discomfort felt by the user for the display can be reduced.

In order to realize such a display, the position setting section 124 can predict the movement destination of the pointing position 250, for example. In such a case, the position setting section 124 sets the z-coordinate of the pointing position 250 of when it is moving in the gap between the object 210a and the object 210b such that the z-coordinate of the pointing position 250 changes continuously between the z-coordinate of the object 210a that the pointing position 250 overlaps before the movement and the z-coordinate of the object 210b that the pointing position 250 is predicted to overlap after the movement.

Alternatively, the position setting section 124 can set the z-coordinate of the pointing position 250 of when it is moving in the gap between the objects 210 on the basis of a depth map prepared in advance in accordance with the arrangement of the objects 210 in the three-dimensional space 200. The depth map is a map on which the z-coordinate is correlated with the x-coordinate and the y-coordinate of the three-dimensional space 200. The depth map can be defined as a curved plane that continuously connects the z-coordinates of the objects 210 in the gap between the objects 210.

Although FIG. 12 shows a path, which is close to a sine curve, as a continuous change in the z-coordinate of the pointing position 250, the way in which the z-coordinate of the pointing position 250 changes is not limited thereto. For example, the z-coordinate of the pointing position 250 can be changed in a straight line or in any curved line like a Bezier curve. In addition, although this embodiment has described a case in which the cursor object 270 is displayed at the pointing position 250 on the basis of the second embodiment, the pointing line 260 that passes through the pointing position 250 can also be displayed as in the first embodiment.

(5. Fourth Embodiment)

Next, the fourth embodiment of the present disclosure will be described. In this embodiment, the acquisition section 122 of the information processing device 100 acquires an operation of moving the reference point 230, and the position setting section 124 moves the reference point 230 on the basis of the moving operation. In the following description, the setting of the pointing position 250 in this embodiment will be described with reference to FIGS. 13 and 14, and then an operation of moving the reference point 230 in this embodiment will be described with reference to FIG. 15. Note that this embodiment differs from the first to third embodiments in that the reference point 230 is moved. However, as the other functions and configurations are approximately the same as those in the first to third embodiments, detailed description thereof will be omitted.

Figure 13:
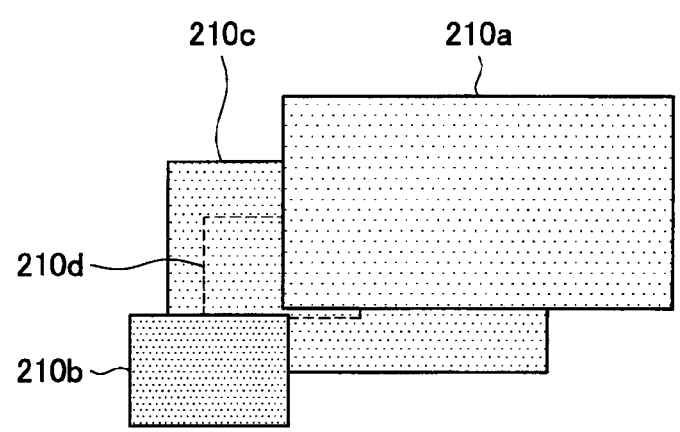
FIG. 13 is a diagram illustrating the setting of a pointing position in the fourth embodiment of the present disclosure.

FIG. 13 is a diagram illustrating the setting of the pointing position 250 in the fourth embodiment of the present disclosure. FIG. 13 shows a state in which a display of objects 210a to 210d is seen from the front side of the display screen 130. The objects 210a to 210d are displayed such that they are overlaid on top of one another, and the object 210d is arranged behind the object 210c. The configuration of this embodiment can be advantageously used when the plurality of objects 210 are displayed in this manner.

Figure 14:
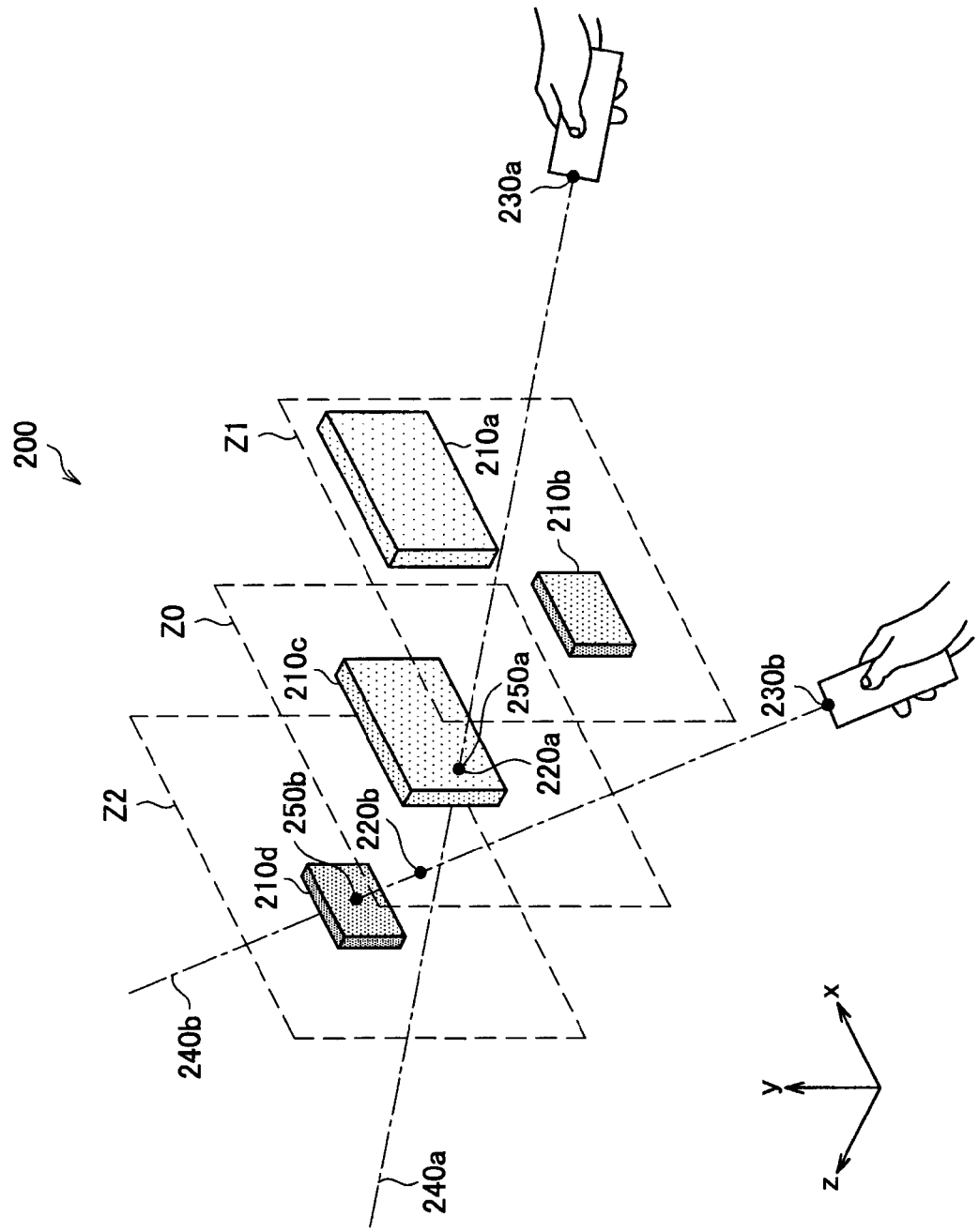
FIG. 14 is a diagram illustrating the setting of a pointing position in the fourth embodiment.

FIG. 14 is a diagram illustrating the setting of the pointing position 250 in the fourth embodiment of the present disclosure. Referring to FIG. 14, the object 210c is arranged on the plane Z0, and the objects 210a and 210b are arranged on the plane Z1 on the front side of the plane Z0. Further, the object 210d is arranged on the plane Z2 on the rear side of the plane Z0. In the drawing, a reference point 230a and a reference point 230b are shown as the reference point 230 before and after the movement.

In the state before the movement, the reference point 230a is set, and a reference line 240a is set as a straight line passing through the reference point 230a and a provisional pointing position 220a. In the example shown in the drawing, a pointing position 250a is the intersection point between the reference line 240a and the object 210c. Note that as the object 210c is located on the plane Z0, the pointing position 250 is located at the same position as the provisional pointing position 220.

In such a state, the acquisition section 122 of the information processing device 100 acquires a pointing operation, and the position setting section 124 sets the provisional pointing position 220a on the plane Z0 in accordance with the acquired pointing operation. In this manner, by moving the provisional pointing position 220a and thereby moving the reference line 240a passing through the provisional pointing position 220a, the user moves the pointing position 250 to the desired object 210. However, the reference point 230a is set on the side of the negative direction of the z-axis of the objects 210a to 210d, that is, on the front side of the display screen. Therefore, even when the provisional pointing position 220a is moved on the plane Z0 so that the object 210d arranged behind the object 210c is pointed, the reference line 240a will intersect the object 210c on the front side of the object 210d, and thus, the pointing position 250 is set at the intersection point between the object 210c and the reference line 240a.

Meanwhile, in the state after the movement, the reference point 230b is set, and a reference line 240b is set as a straight line passing through the reference point 230b and the provisional pointing position 220b. In the example shown in the drawing, the pointing position 250b is the intersection point between the reference line 240b and the object 210d.

The reference point 230b after the movement can be a point obtained by moving the reference point 230a before the movement in the negative direction of the x-axis and the y-axis. When the reference point 230b is moved and further the provisional pointing position 220 is moved on the plane Z0 as described above, the reference line 240b that does not have an intersection point with the object 210c but has an intersection point with the object 230d is set. When the reference point 230 is moved as described above, it becomes possible to easily point an object 210 that is located behind another object 210 and thus is difficult to be pointed with the use of a single reference point.

As described above, moving operations that the acquisition section 122 of the information processing device 100 acquires via the operation section 110 to move the reference point 230 can differ depending on the type of the operation section 110. For example, when the operation section 110 includes a pointing device using a sensor such as a gyro sensor or an acceleration sensor, the movement of the pointing device can be an operation of moving the reference point 230. In such a case, if the reference point 230 is set as a virtual hand position of a user in the three-dimensional space 200, the user is able to move the reference point 230 with a feeling that he/she is moving the hand while gripping the pointing device. The pointing device and the hand shown at the reference point 230 in the drawing shows an exemplary sense that a user feels when performing an operation of moving the reference point 230 in the manner described above. Meanwhile, when the operation section 110 includes a keyboard, a given key can be assigned for performing an operation of moving the reference point 230. Further, an operation of moving the reference point 230 when the operation section 110 includes a mouse will be hereinafter described with reference to FIG. 15.

Figure 15:
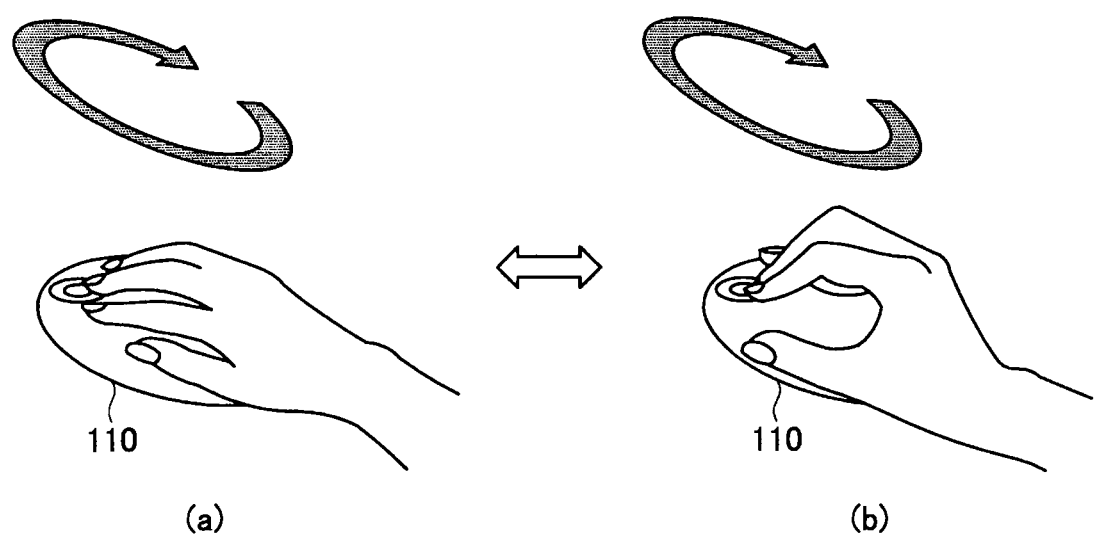
FIG. 15 is a diagram showing an exemplary operation of moving a reference point in the fourth embodiment.

FIG. 15 is a diagram showing an exemplary operation of moving the reference point 230 in the fourth embodiment of the present disclosure. FIG. 15 shows an exemplary operation of moving the reference point 230 when the operation section 110 of the information processing device 100 includes a mouse. In the example shown in the drawing, when moving the provisional pointing position 220, the user moves the mouse without pressing the mouse button as shown in (a). Meanwhile, when moving the reference point 230, the user moves the mouse while pressing the mouse button as shown in (b).

(6. Fifth Embodiment)

Next, the fifth embodiment of the present disclosure will be described. In this embodiment, the acquisition section 122 of the information processing device 100 acquires an operation of switching the selection of the object 210, and the position setting section 120 switches the setting of the pointing position 250 on the basis of the selection switching operation. In the following description, the setting of the pointing position 250 in accordance with this embodiment will be described with reference to FIG. 16. Note that this embodiment differs from the first to fourth embodiments in that the pointing position 250 is switched. However, as the other functions and configurations are approximately the same as those in the first to fourth embodiments, detailed description thereof will be omitted.

Figure 16:
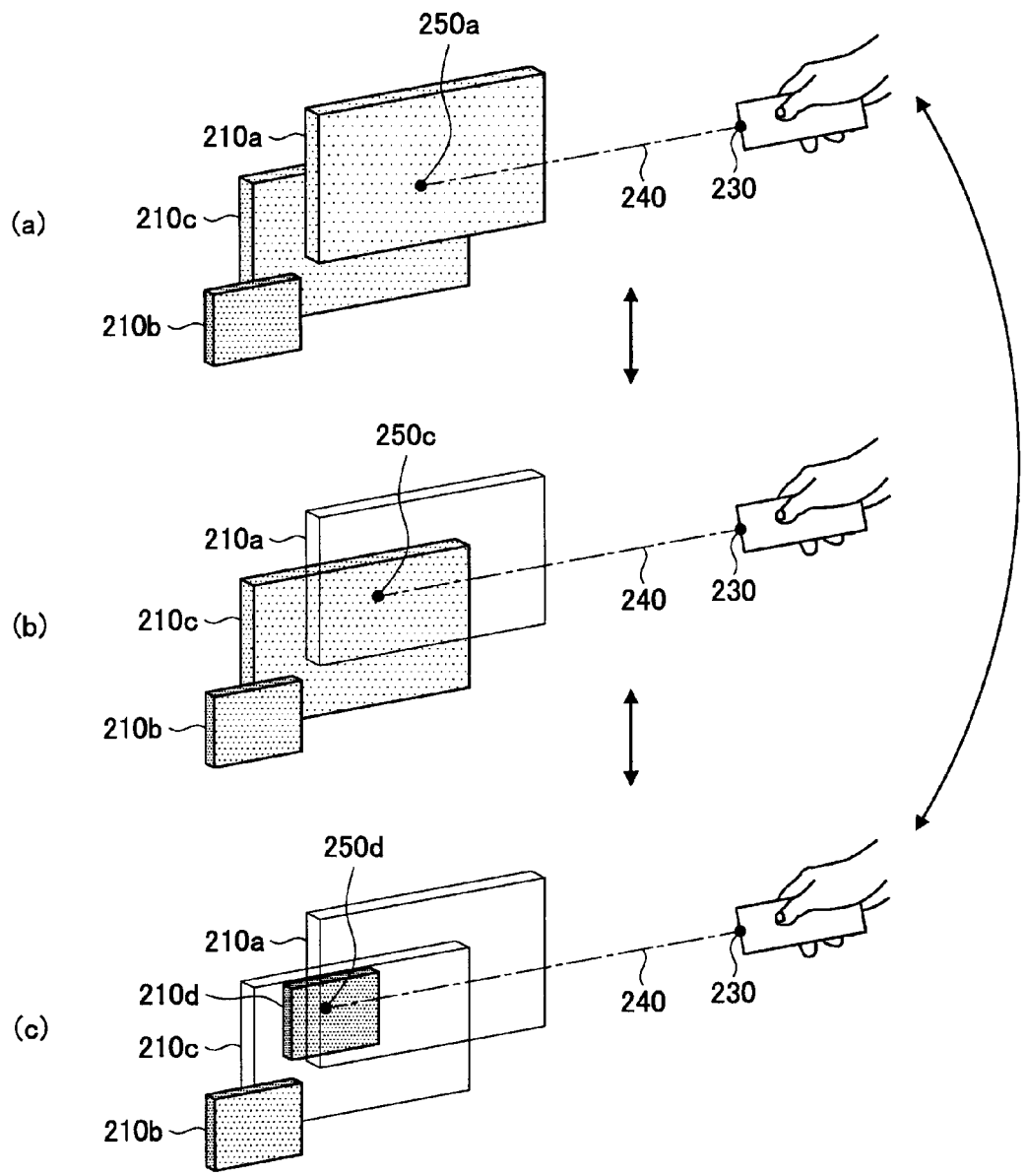
FIG. 16 is a diagram illustrating the setting of a pointing position in the fifth embodiment of the present disclosure.

FIG. 16 is a diagram illustrating the setting of the pointing position 250 in the fifth embodiment of the present disclosure. Referring to FIG. 16, the reference line 240 has intersection points with an object 210a, an object 210c, and an object 210d, and the pointing position 250 is set at an intersection point between one object selected from among the objects and the reference line 240. Although the provisional pointing position 220 is not shown in the drawing for simplicity, the reference line 240 can be set as a straight line passing through the reference point 230 and the provisional pointing position 220 as in the other embodiments.

The objects 210a to 210d are a plurality of objects arranged in a similar way to the objects 210a to 210d described with reference to FIG. 13 in the fourth embodiment. The reference line 240 passing through the reference point 230 has intersection points with the object 210a, the object 210c, and the object 210d among the objects. The position setting section 124 of the information processing device 100 selects one object from among the object 210a, the object 210c, and the object 210d, and sets the pointing position 250 at the intersection point between the selected object and the reference line 240.

In (a) of the example shown in the drawing, the object 210a is selected, and a pointing position 250a is set at the intersection point between the object 210a and the reference line 240. Meanwhile, in (b), the object 210c is selected, and a pointing position 250c is set at the intersection point between the object 210c and the reference line 240. In (c), the object 210d is selected, and a pointing position 250d is set at the intersection point between the object 210d and the reference line 240. Herein, when an object 210 on a more rear side seen from the front side of the display screen 130 is selected, an object 210 on the front side can be displayed transparently. In the example shown in the drawing, the object 210a is displayed transparently in (b), and the object 210a and the object 210c are displayed transparently in (c).

In this embodiment, the acquisition section 122 of the information processing device 100 acquires an operation of switching the selection of the object 210, and the position setting section 124 switches the selected object 210 on the basis of the selection switching operation. The selection switching operation that the acquisition section 122 acquires via the operation section 110 can differ depending on the type of the operation section 110. For example, when the operation section 110 includes a keyboard, keys for changing the object 210 on which the pointing position 250 is set to a more rear object 210 and to a more front object 210 can be assigned. Meanwhile, when the operation section 110 includes a mouse with a wheel, an operation of changing the object 210 on which the pointing position 250 is set to a more rear object 210 or to a more front object 210 can be acquired through rotation of the mouse wheel in a given direction. Alternatively, when the operation section 110 includes a pointing device using a sensor such as a gyro sensor or an acceleration sensor, an operation of changing the object 210 on which the pointing position 250 is set to a more rear object 210 or to a more front object 210 can be acquired through tilting of the pointing device in a given direction. Through the aforementioned operations, the user changes the selection state among (a), (b), and (c) shown in FIG. 16.

(7. Sixth Embodiment)

Next, the sixth embodiment of the present disclosure will be described. In this embodiment, a cursor object 370 with a blurred contour is displayed. In the following description, a display of the pointing position in this embodiment will be described. Note that this embodiment differs from the first embodiment in that the provisional pointing position 220, the reference point 230, and the reference line 240 are not set and that the pointing position is set as it is on the basis of a pointing operation. However, as the other functions and configurations are approximately the same as those in the first embodiment, detailed description thereof will be omitted.

Figure 17:
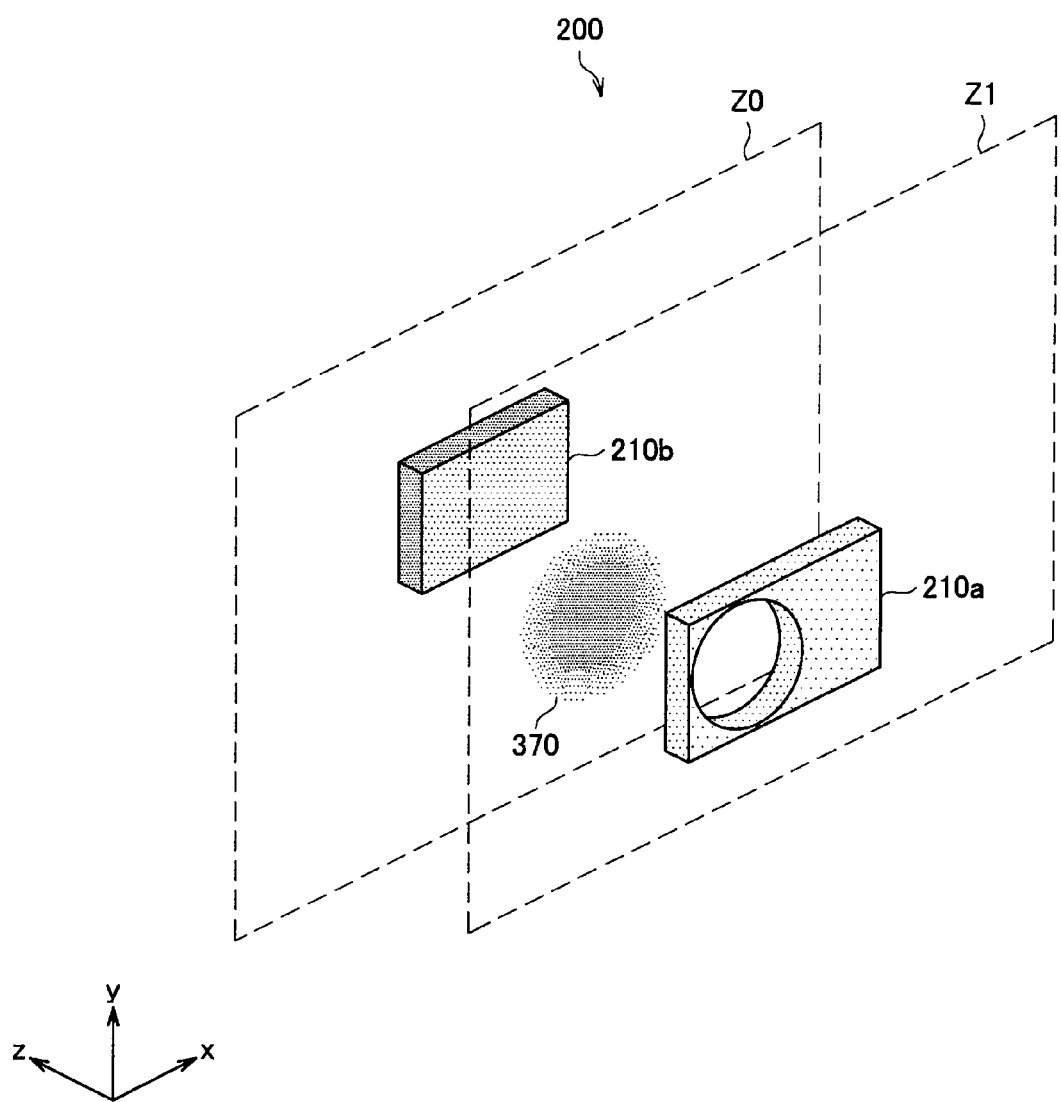
FIG. 17 is a diagram showing a display example of a pointing position in the sixth embodiment of the present disclosure.

FIG. 17 is a diagram showing a display example of the pointing position in the sixth embodiment of the present disclosure. Referring to FIG. 17, in the three-dimensional space 200, an object 210a is arranged on the plane Z1 and an object 210b is arranged on the plane Z0. In addition, in the three-dimensional space 200, the pointing position is set on the plane Z0 and the cursor object 370 is displayed.

In the example shown in the drawing, the cursor object 370 and the object 210a are in a state of overlapping each other in the x-coordinate and the y-coordinate, that is, a state in which the object 210a can be selected by the cursor object 370. However, the cursor object 370 on the plane Z0 has a different z-coordinate from the object 210a on the plane Z1. Thus, if the cursor object 370 is displayed such that it is overlaid on the object 210a, the cursor object 370 is displayed such that it sinks into the rear side from the surface of the object 210a.

However, the cursor object 370 displayed in this embodiment is a cursor object with a blurred contour. The boundary between the cursor object 370 and the object 210a is not clearly recognized by the user. Thus, even when the cursor object 370 is displayed such that it sinks into the rear side from the surface of the object 210a, the user will not feel the difference between the cursor object 370 and the object 210a in the depth direction much. Even when the three-dimensional space 200 is displayed as a stereoscopic image on the display screen 130, the user will not feel much that there is a contradiction between the parallax set on the cursor object 370 and the parallax set on the object 210a as the contour of the cursor object 370 is blurred. That is, in this embodiment, the difference between the cursor object 370 and the object 210a in the depth direction is visually corrected using the visual perception of the user.

(8. Conclusion)

In the embodiments of the present disclosure described above, the information processing device 100 includes the display control section 126 configured to display the three-dimensional space 200 in which the objects 210 are arranged on the display screen 130, the acquisition section 122 configured to acquire a pointing operation in the three-dimensional space 200, and the position setting section 124 configured to set the pointing position 250 in the three-dimensional space 200. The display control section 126 displays the pointing position 250 in the three-dimensional space 200 by correcting the difference between the pointing position 250 and the object 210 in the depth direction of the display screen 130. According to such a configuration, it is possible to perform a display in which a sense of discomfort felt by the user due to the difference between the display of the object and the pointing display in the depth direction is reduced in the GUI of the three-dimensional space.

The position setting section 124 can set the provisional pointing position 220 in the three-dimensional space 200 on the basis of a pointing operation, and can set the pointing position 250 on the reference line 240 that passes through the provisional pointing position 220 and the reference point 230 set in the three-dimensional space 200. According to such a configuration, even when a pointing operation specifies the two-dimensional coordinates, it is possible to change the pointing position in the depth direction and thus reduce a sense of discomfort felt by the user due to the difference between the object and the pointing position in the depth direction.

The display control section 126 can display on the reference line 240 the pointing line 260 that passes through the pointing position 250. According to such a configuration, a reference line that includes the pointing position is partly or entirely displayed in the three-dimensional space, and thus the user is able to easily grasp the position of the pointing position in the depth direction.

The display control section 126 can display the pointing line 260 as a line segment that starts at the reference point 230 and ends at the pointing position 250. According to such a configuration, the user is able to easily recognize the pointing position as an end point of the line segment.

The display control section 126 can display the cursor object 270 at the pointing position 250. According to such a configuration, the user is able to easily recognize the pointing position as the display position of the cursor object.

The position setting section 124 can set the pointing position 250 at the intersection point between the object 210 and the reference line 240. According to such a configuration, the pointing position matches the position of the pointed objected in the depth direction, and thus the depth of the object and the depth of the pointing position become approximately equal. Thus, it is possible to significantly reduce a sense of discomfort felt by the user for the display of the GUI of the three-dimensional space.

The position setting section 124 can select one object 210 from among a plurality of objects 210 each having an intersection point with the reference line 240, and can set the pointing position 250 at the intersection point between the selected object 210 and the reference line 240. According to such a configuration, even when there is a plurality of objects on the reference line, it is possible to select and point an adequate object.

The acquisition section 122 can acquire an operation of switching the selection of the object 210, and the position setting section 124 can switch the selected object 210 on the basis of the selection switching operation. According to such a configuration, the user is able to, when selecting an object to be pointed from among a plurality of objects, select the desired object.

The position setting section 124 can, when there is no intersection point between the object 210 and the reference line 240, set the pointing position 250 on the basis of the position(s) of one or more objects 210 located around the reference line 240. According to such a configuration, it is possible to prevent the pointing position in the depth direction from varying greatly depending on whether or not the reference line has an intersection point with an object. Thus, a sense of discomfort felt by the user for the display of the GUI of the three-dimensional space can be reduced.

The acquisition section 122 can acquire an operation of moving the reference point 230, and the position setting section 124 can move the reference point 230 on the basis of the moving operation. According to such a configuration, it is possible to easily point an object, which would be difficult to be pointed if the reference point is fixed, by moving the reference point to an adequate position.

The display control section 126 can display at the pointing position 250 the cursor object 370 with a blurred contour for visually correcting the difference in the depth direction. According to such a configuration, the boundary between the pointed object and the cursor object becomes not clearly recognized, whereby a sense of discomfort caused by the difference between the pointed object and the cursor object in the depth direction can be reduced.

The display control section 126 can display the three-dimensional space 200 as a stereoscopic image on the display screen 130. When a GUI of a three-dimensional space is displayed as a stereoscopic image, a sense of discomfort felt by the user due to the difference between an object and a pointing position in the depth direction is particularly large. Thus, it is possible to particularly and significantly reduce the sense of discomfort felt by the user using the configuration of the embodiments of the present disclosure.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although the aforementioned embodiments have illustrated an example in which the functions of the acquisition section, the position setting section, and the display control section are provided by a CPU, the present disclosure is not limited thereto. For example, it is also possible to use a DSP (Digital Signal Processor) instead of or in addition to the CPU. Further, the function of the display control section can be provided by a GPU (Graphics Processing Unit) different from the CPU, for example.

In addition, although the aforementioned embodiments have illustrated an example in which the acquisition section acquires a pointing operation that specifies the two-dimensional coordinates, the present disclosure is not limited thereto. For example, the acquisition section can acquire a pointing operation that specifies the three-dimensional coordinates. Even when a pointing operation that specifies a given position in a three-dimensional space can be performed using the three-dimensional coordinates, it would often be not easy to perform an operation of pointing an accurate position, in particular, in the depth direction. Therefore, even when the acquisition section acquires a pointing operation that specifies the three-dimensional coordinates, there may be cases in which a difference between the pointing position and an object in the depth direction may occur. Thus, the configuration of the aforementioned embodiments can be advantageously used even in such cases.

The present disclosure contains subject matter related to that disclosed in Japanese Priority Patent Application JP 2010-199743 filed in the Japan Patent Office on Sep. 7, 2010, the entire content of which is hereby incorporated by reference.

What is claimed is:

1. An information processing device comprising:
a display control section which causes a three-dimensional space in which an object is arranged to be displayed on a display screen;
an acquisition section which acquires a pointing operation in the three-dimensional space; and
a position setting section which sets a pointing position in the three-dimensional space on the basis of the pointing operation,
wherein the display control section causes the pointing position to be displayed in the three-dimensional space at x-coordinate and y-coordinate positions corresponding to a point upon a surface of the displayed object, a difference between the pointing position and a position of the object in a depth direction of the display screen having been corrected by setting a z-coordinate depth position of the displayed object to correspond to a z-coordinate depth of the displayed object,
wherein the position setting section sets a provisional pointing position in the three-dimensional space on the basis of the pointing operation, and sets the pointing position on a reference line passing through the provisional pointing position and a reference point set in the three-dimensional space,
wherein the position setting section sets the pointing position at an intersection point between the object and the reference line, and
wherein the position setting section selects the object from among a plurality of objects each having an intersection point with the reference line, and sets the pointing position at the intersection point between the selected object and the reference line.

2. The information processing device according to claim 1, wherein the display control section causes a pointing line passing through the pointing position to be displayed on the reference line.

3. The information processing device according to claim 2, wherein the display control section causes the pointing line to be displayed as a line segment that starts at the reference point and ends at the pointing position.

4. The information processing device according to claim 1, wherein the display control section causes a cursor object to be displayed at the pointing position.

5. The information processing device according to claim 1, wherein
the acquisition section acquires an operation of switching a selection of the object, and
the position setting section switches the selected object on the basis of the operation of switching the selection of the object.

6. The information processing device according to claim 1, wherein the display control section causes a cursor object to be displayed at the pointing position with a blurred contour for visually correcting a difference in the depth direction by obscuring a boundary between the displayed object and the cursor object due to the blur.

7. The information processing device according to claim 1, wherein the display control section causes the three-dimensional space to be displayed on the display screen as a stereoscopic image.

8. The information processing device according to claim 1, wherein the reference point corresponds to a position of a hand of an operator that performs the pointing operation.

9. The information processing device according to claim 8, wherein the position of the hand of the operator to which the reference point corresponds is a location from which the operator specifies, through the pointing operation, the pointing position in the three-dimensional space.

10. An information processing comprising:
a display control section which causes a three-dimensional space in which an object is arranged to be displayed on a display screen;
an acquisition section which acquires a pointing operation in the three-dimensional space; and
a position setting section which sets a pointing position in the three-dimensional space on the basis of the pointing operation,
wherein the display control section causes the pointing position to be displayed in the three-dimensional space at x-coordinate and y-coordinate positions corresponding to a point upon a surface of the displayed object, a difference between the pointing position and a position of the object in a depth direction of the display screen having been corrected by setting a z-coordinate depth position of the displayed object to correspond to a z-coordinate depth of the displayed object,
wherein the position setting section sets a provisional pointing position in the three-dimensional space on the basis of the pointing operation, and sets the pointing position on a reference line passing through the provisional pointing position and a reference point set in the three-dimensional space, and
wherein the position setting section, when there is no intersection point between the object and the reference line, sets the pointing position on the basis of positions of one or more objects located around the reference line.

11. An information processing comprising:
a display control section which causes a three-dimensional space in which an object is arranged to be displayed on a display screen;
an acquisition section which acquires a pointing operation in the three-dimensional space; and
a position setting section which sets a pointing position in the three-dimensional space on the basis of the pointing operation,
wherein the display control section causes the pointing position to be displayed in the three-dimensional space at x-coordinate and y-coordinate positions corresponding to a point upon a surface of the displayed object, a difference between the pointing position and a position of the object in a depth direction of the display screen having been corrected by setting a z-coordinate depth position of the displayed object to correspond to a z-coordinate depth of the displayed object,
wherein the position setting section sets a provisional pointing position in the three-dimensional space on the basis of the pointing operation, and sets the pointing position on a reference line passing through the provisional pointing position and a reference point set in the three-dimensional space, and
wherein the acquisition section acquires an operation of moving the reference point, and the position setting section moves the reference point on the basis of the operation of moving the reference point.

12. A non-transitory computer-readable medium having embodied thereon a program, which when executed by a computer causes the computer to execute the processes of:
causing a three-dimensional space in which an object is arranged to be displayed on a display screen;
acquiring a pointing operation in the three-dimensional space;
setting a pointing position in the three-dimensional space on the basis of the pointing operation; and
causing the pointing position to be displayed in the three-dimensional space at x-coordinate and y-coordinate positions corresponding to a point upon a surface of the displayed object, a difference between the pointing position and a position of the object in a depth direction of the display screen having been corrected by setting a z-coordinate depth position of the displayed object to correspond to a z-coordinate depth of the displayed object,
wherein a provisional pointing position is set in the three-dimensional space on the basis of the pointing operation, and the pointing position is set on a reference line passing through the provisional pointing position and a reference point set in the three-dimensional space,
wherein the pointing position is set at an intersection point between the object and the reference line, and
wherein the object is selected from among a plurality of objects each having an intersection point with the reference line, and the pointing position is set at the intersection point between the selected object and the reference line.

13. The non-transitory computer-readable medium according to claim 12, wherein the reference point corresponds to a position of a hand of an operator that performs the pointing operation.

14. An information processing method comprising:
causing a three-dimensional space in which an object is arranged to be displayed on a display screen;
acquiring a pointing operation in the three-dimensional space;
setting a pointing position in the three-dimensional space on the basis of the pointing operation; and
causing the pointing position to be displayed in the three-dimensional space at x-coordinate and y-coordinate positions corresponding to a point upon a surface of the displayed object, a difference between the pointing position and a position of the object in a depth direction of the display screen having been corrected by setting a z-coordinate depth position of the displayed object to correspond to a z-coordinate depth of the displayed object,
wherein a provisional pointing position is set in the three-dimensional space on the basis of the pointing operation, and the pointing position is set on a reference line passing through the provisional pointing position and a reference point set in the three-dimensional space,
wherein the pointing position is set at an intersection point between the object and the reference line, and
wherein the object is selected from among a plurality of objects each having an intersection point with the reference line, and the pointing position is set at the intersection point between the selected object and the reference line.

15. The information processing method according to claim 14, wherein the reference point corresponds to a position of a hand of an operator that performs the pointing operation.

\* \* \* \* \*